OR 3,728,006

United States Patent
Brooks et al.

[11] 3,728,006
[45] Apr. 17, 1973

[54] HOLOGRAPHIC SCHLIEREN METHOD

[75] Inventors: Robert E. Brooks, Redondo Beach; Lee O. Heflinger, Torrance, both of Calif.

[73] Assignee: TRW Inc., Redondo Beach, Calif.

[22] Filed: Oct. 20, 1971

[21] Appl. No.: 190,917

[52] U.S. Cl. ..................350/3.5, 356/106, 356/129
[51] Int. Cl. .................................................G01b 9/02
[58] Field of Search .....................350/3.5; 356/106, 356/109, 129

[56] References Cited

UNITED STATES PATENTS 3,627,426  12/1971  Tsuruta...............................356/109
3,601,466  8/1971  Tsuruta................................350/3.5

Primary Examiner—David Schonberg
Assistant Examiner—Robert L. Sherman
Attorney—Daniel T. Anderson et al.

[57] ABSTRACT

A double exposed hologram is reconstructed by the schlieren method. The hologram of a disturbed and undisturbed scene is twice exposed so that the reference beam forms a different angle with the recording material for each exposure. The recording material has a non-linear characteristic so that intermodulation products of the fringes are generated. The hologram is reconstructed with a reconstruction reference beam. All but a selected diffraction order are eliminated and the selected order is viewed with a knife edge to make visible the phase change of the scene recorded. The reconstruction reference beam must be substantially free of aberrations; otherwise there are no such restrictions on the recording optical elements.

10 Claims, 4 Drawing Figures

PATENTED APR 17 1973  3,728,006

Robert E. Brooks
Lee O. Heflinger
INVENTORS

BY Edw. C. Osw.

ATTORNEY

INVENTOR.
Robert E. Brooks
BY Lee O. Heflinger

ATTORNEY

HOLOGRAPHIC SCHLIEREN METHOD

BACKGROUND OF THE INVENTION

This invention relates generally to holography and particularly relates to the application of the schlieren techniques to double-exposure holography.

In the past, holography has been widely used in the field of interferometry. This permits, for example, to record the displacement or distortion of an object or to generate fringes indicative of the displacement of an object. In the past the displacement of an object has been measured by the application of double-exposure holography. This is effected by exposing the recording material twice with the same scene once in an undisturbed state and once in a disturbed or displaced state. The resulting hologram upon reconstruction shows fringes indicative of the displacement or distortion of the scene such, for example, as a physical distortion of an object or a shock wave caused by the passage of a bullet.

This technique has been widely used for non-destructive testing of objects. However, this interferometric technique directly only shows the displacement or movement of the object. It does not indicate directly the strain causing the distortion which would be a more important indication.

On the other hand, schlieren techniques directly present the rate of change of displacement information. That is, they directly present strain information. Holographic schlieren systems have been used in the prior art but because they were single exposure systems they were restricted to precision reconstructions, usually even requiring reconstructions in the identical apparatus used to make the hologram. One of the prime advantages of the double-exposure holographic interferometry technique is that reconstruction can easily be performed and it is not necessary to reconstruct the hologram in the same apparatus used for recording. In addition a double-exposed hologram has certain other advantages. For example, it is feasible to record permanently, that is for the life of the hologram, events which may happen in the space of a microsecond such as a shock wave or the like. Furthermore, since both exposures are made through the same optical elements, there is not need for aberration-free lenses and other optical components. In other words, upon reconstruction of a double-exposed hologram, one sees only the effects of movement or change of the scene or object. All imperfections of the optics or aberrations of the laser are eliminated.

It is accordingly an object of the present invention to extend to schlieren observations the ease of reconstructions and absence of requirement for precision optics possessed by the double-exposure holographic interferograms.

Another object of the present invention is to provide a method of investigating directly the actual strain of an object by utilizing a doubly exposed hologram.

A further object of the present invention is to provide a method of viewing a double-exposed hologram by means of a knife edge or the like.

Still another object of the present invention is make it possible to record a double-exposed hologram with a laser which may be phase aberrated or with imperfect optics by utilizing the schlieren method.

SUMMARY OF THE INVENTION

In accordance with the present invention a method is provided for reconstructing a hologram of a scene by the schlieren method. The hologram is recorded on a non-liner recording material. It is well known that photographic emulsion, for example, as well as most other recording materials are by nature non-linear.

In accordance with the method of the invention a double-exposure hologram is first recorded. For the first recording the reference beam makes a first predetermined angle which is changed for the second exposure. The scene is disturbed between the two exposures and it is this change that is the phenomenon to be studied. Thus, the scene may be distorted by the passage of a bullet creating a shock wave or by some other aerodynamic flow.

The double-exposed hologram is now reconstructed with a reconstruction reference beam which is similar to the recording reference beam, but need not be a precision copy of the recording reference beam. Upon reconstruction the hologram plays back the usual scene beam of conventional holography but this is not used. In addition to the usual scene beam reconstruction the hologram also produces some additional reconstructed beams arising from the non-linear behavior of the recording material. A selected one of these beams is viewed, for example, by a knife edge which permits viewing of the scene by the schlieren method, in as much as this selected beam contains the phase change information recorded initially on the hologram.

The novel features that are considered characteristic of this invention are set forth with particularlity in the appended claims. The invention itself, however, both as to its organization and method of operation, as well as additional objects and advantages thereof, will best be understood from the following description when read in connection with the accompanying drawings.

DESCRIPTION OF THE PREFERRED EMBODIMENTS

Figure 1:
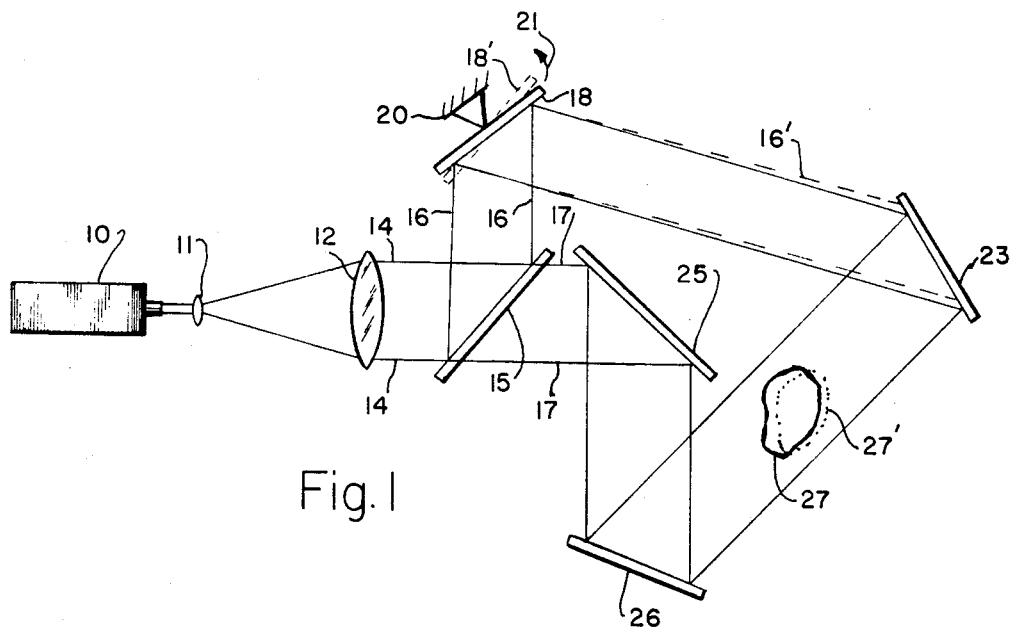
FIG. 1 is a schematic representation of a preferred apparatus for practicing the method of the present invention.

Referring now to the drawings and particularly to FIG. 1, there is illustrated apparatus for performing the method of the invention. This includes a laser 10 for generating a coherent monochromatic light beam. The light beam produced by the laser 10 may be enlarged and collimated by a lens system which may include two positive lenses 11 and 12. However, any other conventional lens system for enlarging and collimating a light beam such as a Gallilean telescope may be used. The enlarged and collimated light beam 14 is not split into two beams by a beam splitter 15 shown schmetically which may, for example, consist of a prism or a glass wedge. As a result, two light beams are obtained, one of which is the reference beam 16 while the other one is the scene beam 17.

The reference beam 16 may now be reflected by a reflector 18 which is preferably rotatable about a pivot point 20 as indicated by the arrow 21. The reference beam 16 is now directed at a recording medium 23 which should be a non-liner recording medium. It may, for example, consist of a photographic emulsion or a photochromic material or the like for recording the hologram.

The scene beam 17 may be twice reflected by a reflector 25 and subsequently by a reflector 26 which direct the scene also onto the recording material 23. An object 27 to be holographed is interposed into the path of the scene beam between the reflector 26 and the recording material 23. The apparatus of FIG. 1 is preferred because the path lengths of the reference beam 16 and the scene beam 17 may be precisely matched to make sure that reference and scene beams are in coherence at the recording material 23. Furthermore, the number of reflections of the reference beam 16 about the beam splitter 15 and reflector 18 equals the number of reflections of the scene bean 17 due to the reflectors 25 and 26. Therefore, the two beams are not transposed with respect to each other so that the same light ray split into reference and scene beam recombines again at the same point of the recording material 23.

The apparatus of FIG. 1 is operated in a conventional manner to provide a first hologram of the object 27. In accordance with the present invention a second hologram is recorded on the same recording material 23. This hologram is recorded of a distorted or displaced object 27' shown in dotted lines on a greatly enlarged scale. Thus, the object 27' may be physically distorted or it may consist of a shock wave created, for example, by a bullet or the aerodynamic flow pattern from a rocket engine or the like. This second hologram is recorded with the rotatable mirror 18 in a different position as shown by the dotted lines at 18'. Accordingly, the reference beam 16' has been rotated as shown so that the second hologram is recorded with the reference beam forming a different angle with the recording material 23.

Figure 2:
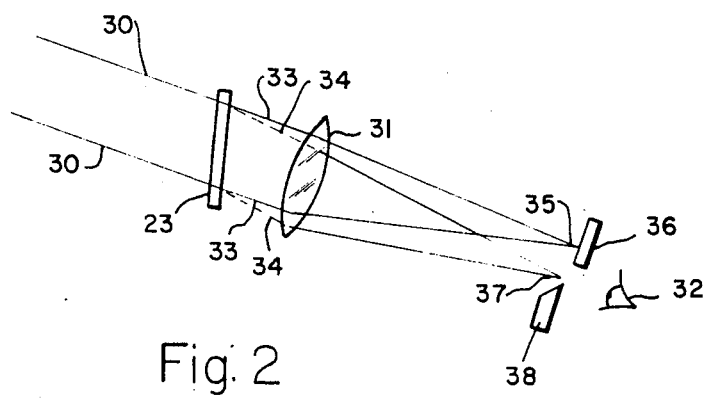
FIG. 2 is a schematic representation of an apparatus for reconstructing a previously double-exposed hologram in accordance with the present invention and utilizing a lens during reconstruction.

The thus obtained double-exposed hologram may be developed if necessary and may be reconstructed by the apparatus illustrated in FIG. 2.

Here the hologram 23 is reconstructed by a reconstruction reference beam 30 which also consists of a coherent monochromatic light beam. It need not be the same light beam as the one developed by the laser 10, but may be generated by a different laser. The angle between the reconstruction reference beam 30 and the hologram 23 need not be the same as that of either recording reference beam 16 or 16'. The light beam 30 may also be collimated as shown. In that case, however, a lens 31 is provided between the hologram 23 and the observer indicated at 32 for providing a light beam which converges in a point.

The double-exposed hologram carries information of the original object 27 and the distorted or displaced object 27'. As a result, a moire pattern is created due to the phase differences between the two recording wave fronts. Since the recorded material 23 is non-liner, intermodulation products of the fringes appearing as a moire pattern, are generated. The moire pattern is basically a grating with a spacing corresponding to the angular offset of the reference beam between the two exposures. However, the phase distortions of the subject carry over to this moire pattern. As a result, the reconstruction reference beam produces on playback a series of beams shown at 33 and 34 corresponding to the change in the reference beam angle between exposures. These, in turn, are focused by the lens 31 into various diffraction orders, one of which is shown at 35 which is blocked off by a mask 36 while another one shown at 37 may be viewed by the observer 32 through a knife edge 38 which is put close to the focal point of the beam.

By means of the knife edge 38, the conventional schlieren presentation may be obtained in which, for example, regions of increasing change are rendered bright and regions of decreasing subject change are rendered dark.

By viewing not the first diffracted order but the second or third diffracted order, it is possible to increase the phase shift two or three times thereby to obtain a phase magnification. Thus, the phase change in the beam may be multiplied by the order of diffraction which is viewed.

Preferably as shown in FIG. 1, there is utilized a relatively large angle between the reference and scene beams. This angle is not in any way critical but may be in the order of 30° to 40'. If the angle is too small the amount of noise is increased. Furthermore, the reference beam such as shown in 16' may be offset approximately 2° between exposures.

The method of the invention has the usual advantages of double-exposure holography. Thus, the recording laser beam 14 may be phase aberrated without causing any noise in the reconstructed hologram. For the same reason the optical elements used in FIG. 1 need not be free of aberration or imperfections because the object is recorded twice through the same optical system.

On the other hand, the reconstruction reference beam 30 must be free of phase aberration and the optics used for reconstruction such as the lens 31 must be a high quality lens. The schlieren system which is obtained by means of a knife edge 38 shows directly the strain of an object that is the rate of change of displacement of the object, rather than the displacement or movement as is conventional with the usual interferometric test.

For a mathematical analysis of the method of the invention it may be assumed as shown in FIG. 1 that both reference and scene beams are collimated. Accordingly, they will form a hologram which is essentially a plane diffraction grating. The grating spacing for the first exposure is given as follows:

$$S_1 = (\lambda)/(\sin\alpha_1 - \sin\beta_1) \qquad 1.$$

where $S_1$ is the grating spacing, as $\lambda$ is the recording wave length, and $\alpha_1$ is the angle of the subject beam with the recording material and $\beta_1$ is the angle of the reference beam with the recording material.

Similarly, the grating spacing $S_2$ of the second exposure is given as follows:

$$S_2 = (\lambda)/(\sin\alpha_2 - \sin\beta_2) \quad 2.$$

where $\alpha_2$ and $\beta_2$ are respectively the angles of the subject and reference beams with the recording material for the second exposure.

The moire beat frequency is equal to the difference between the two fringe frequencies and is given as follows:

$$1/S_3 = (1/S_2) - (1/S_1) = (\sin\gamma - \sin\delta)/(N\lambda') \quad 3.$$

where $\gamma$ is the angle of the light diffracted by the moire pattern and $\delta$ is the angle of the reconstruction reference beam, N is the order of diffraction by the moire pattern and $\lambda'$ is the reconstruction wave length. By rearranging terms the following equation is obtained.

$$\gamma - \delta = \frac{\lambda'}{\lambda} N \left[ (\alpha_2 - \alpha_1) \frac{\cos\alpha_1}{\cos\delta} - (\beta_2 - \beta_1) \frac{\cos\beta_1}{\cos\delta} \right] \quad (4)$$

In this equation the cosine terms are essentially constant and if the angles are small they are close to unity. The formula shows, for example, that the first order diffraction occurs essentially at the reference beam offset angle $\beta_2 - \beta_1$ and moreover depends on the subject perturbation angle $\alpha_2 - \alpha_1$. It is thus possible to perform a knife edge test on this diffracted light to obtain the subject perturbation information. The formula also indicates that the angular deviation of the reconstruction and the subject perturbation is proportional to the other of diffraction.

Instead of using a focusing lens 31 for the reconstruction of a hologram made with a collimated reference beam, it is also feasible to utilize a lens while recording the hologram. Such an apparatus has been shown in FIG. 3 to which reference is now made.

Figure 3:
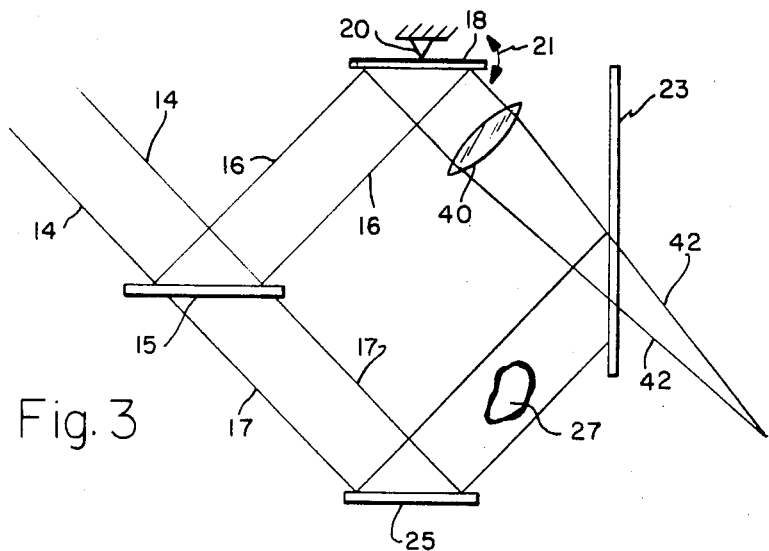
FIG. 3 is a schematic representation of an apparatus for doubly-exposing a hologram in accordance with the method of the present invention utilizing a converging reference beam by the use of a lens ahead of the hologram.

The apparatus of FIG. 3 is generally the same as that of FIG. 1 although it should be noted that only one reflector 25 is used in the path of the scene beam. The enlarged and collimated laser beam is shown at 14. In this case, however, a focusing lens 40 is shown in the path of the reference beam 16 between the rotatable reflector 18 and the recording material 23. Accordingly, the reference beam 42 converges to a point as shown. It will be understood that the reflector 18 will be rotated between the two exposures.

The developed hologram may be reconstructed as shown in FIG. 2 except that the reconstruction reference beam now should also be a converging beam. Thus, the hologram 23 may be reconstructed in the apparatus of FIG. 3 by blocking of the scene beam 17. What has been said above about the quality of the reconstruction reference beam applies again to the apparatus of FIG. 3.

The holographic schlieren method of the invention may also be applied to an object in reflection. This may be accomplished with the apparatus of FIG. 4 to which reference is now made.

Here the reflecting object 45 is illuminated by an incoming laser beam 46 which may be collimated as shown. The light reflected from the object 45 is focused by a lens 47 on the recording material 48 in such a way that the real image 45' at the recording material 48 and the object 45 are at conjugate foci of the lens 47. The reference beam 50 may be a converging reference beam which is reflected by a reflector 51 on the recording material 48. It will be understood that the reflector 51 is again rotatable so that the angle of the reference beam is different for the two exposures.

The reference beam 50 may be used as a reconstruction reference beam and the selected diffraction order which is focused at 52 may be viewed by a knife edge 53 while the undesired orders are blocked by the mask 54.

Figure 4:
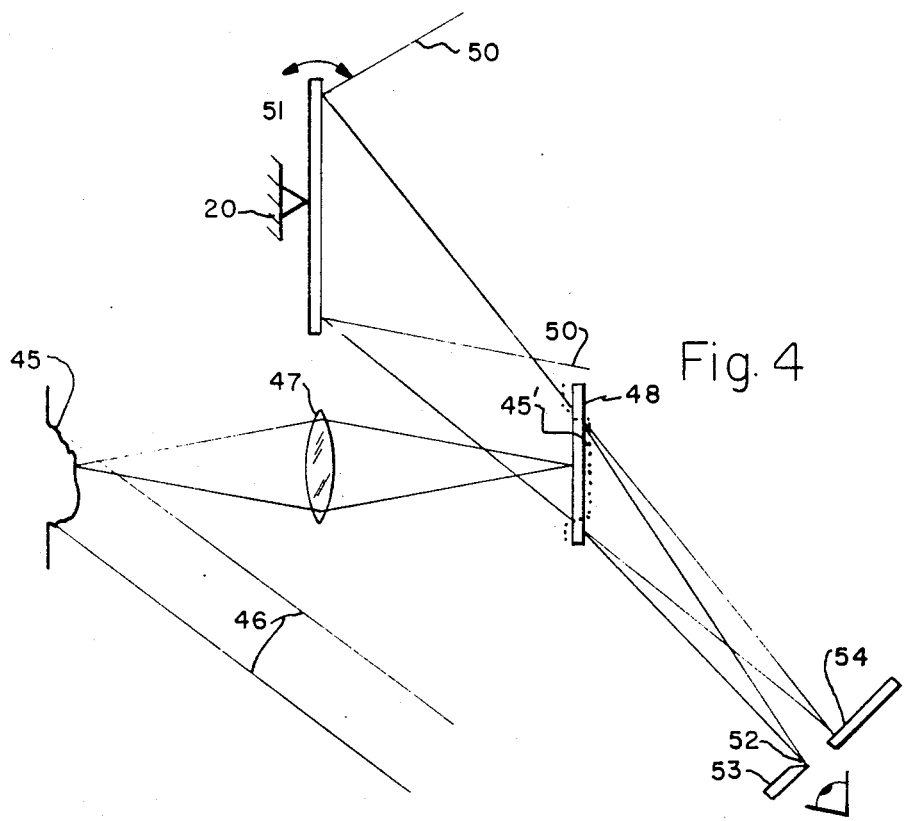
FIG. 4 is a schematic representation of an apparatus for recording a double-exposed hologram of an object in reflection taken with a converging reference beam.

Otherwise, the embodiment of the invention of FIG. 4 operates in the same manner as previously described.

There has thus been disclosed a method of viewing a double-exposure hologram by the schlieren technique. This has the advantage that the strain of the object can be determined directly rather than the displacement or distortion of the object which may not be as directly related to the stability of an object as is the underlying strain. Furthermore, the method of the invention has the advantage that the recording laser may be phase aberrated as long as the reconstruction reference beam is aberration free as well as the optical elements which may have to be used for the reconstruction reference beam. The recording material must be non-linear to create the intermodulation products of the fringes caused by the doible exposure. However, most practical recording materials are non-linear. Furthermore, it is possible to magnify the phase change of the beam by the diffraction order.

What is claimed is:

1. A method of recording and reconstructing a hologram of a scene by the schlieren method on a non-linear recording material, which comprises the steps of:
   a. generating a monochromatic light beam;
   b. splitting said light beam into a reference beam and a scene beam;
   c. casting the reference beam on the recording material at a first predetermined angle;
   d. casting the scene beam upon a scene to be recorded in a first state and then onto the recording material to record a first hologram;
   e. subsequently casting the reference beam at a second predetermined angle at the recording material;
   f. casting the scene beam on the scene in a second state and then onto the same recording material to record a second hologram, the scene in its first and second state being disturbed in one state with respect to the other;
   g. reconstructing the thus obtained double-exposure hologram by illuminating the hologram with a reconstruction reference beam to obtain a moire pattern corresponding to the phase difference between the two recorded wave fronts; and
   h. viewing a selected one of the resulting diffraction orders of the moire pattern by a knife edge, thereby to view the scene by the schlieren method.

2. A method as defined in claim 1 wherein the scene beam is passed through the scene.

3. A method as defined in claim 1 wherein the scene beam is reflected from the scene.

4. A method as defined in claim 3 wherein an image of the scene is focused on the hologram.

5. A method as defined in claim 1 wherein the angle of the reconstruction reference beam with the recording material is different from said first and second predetermined angles.

6. A method as defined in claim 1 wherein the reconstruction reference beam is a converging bean converging in a predetermined point in the vicinity of which the knife edge is positioned.

7. A method as defined in claim 1 wherein each of said reference beams is a converging bean converging in a predetermined point.

8. A method as defined in claim 1 wherein the reconstruction reference beam is substantially free of aberrations.

9. A method as defined in claim 1 wherein the unwanted diffracted orders of the reconstruction reference beam are blocked off.

10. A method as defined in claim 1 wherein a knife edge is positioned near the focal point of one of the diffracted orders which permits viewing of the phase changes of the scene recorded on the double exposure hologram.

* * * * *